US012713455B2

(12) United States Patent
Nam et al.

(10) Patent No.: US 12,713,455 B2
(45) Date of Patent: Aug. 18, 2026

(54) MULTIPLE BEAM OPERATIONS IN WIRELESS COMMUNICATION SYSTEMS

(71) Applicant: Samsung Electronics Co., Ltd., Suwon-si (KR)

(72) Inventors: Young Han Nam, Plano, TX (US); Boon Loong Ng, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 95 days.

(21) Appl. No.: 18/522,081

(22) Filed: Nov. 28, 2023

(65) Prior Publication Data

US 2024/0215065 A1 Jun. 27, 2024

Related U.S. Application Data

(60) Provisional application No. 63/434,741, filed on Dec. 22, 2022.

(51) Int. Cl.
*H04W 76/00* (2018.01)
*H04B 7/06* (2006.01)
(Continued)

(52) U.S. Cl.
CPC ........ *H04W 74/006* (2013.01); *H04B 7/0617* (2013.01); *H04W 74/0833* (2013.01)

(58) Field of Classification Search
CPC ... H04L 5/0053; H04L 5/0048; H04L 5/0051; H04W 72/23; H04W 74/0833;
(Continued)

(56) References Cited

U.S. PATENT DOCUMENTS

2018/0054276 A1* 2/2018 Islam .................... H04L 5/0048
2018/0376429 A1* 12/2018 Islam .................... H04W 52/16
(Continued)

FOREIGN PATENT DOCUMENTS

CN 111918392 A 11/2020
WO 2021083140 A1 5/2021
(Continued)

OTHER PUBLICATIONS

International Search Report and Written Opinion issued Apr. 2, 2024 regarding International Application No. PCT/KR2023/021036, 9 pages.
(Continued)

*Primary Examiner* — Allahyar Kasraian

(57) ABSTRACT

Methods and apparatuses for supporting multiple beam operations in wireless communication systems is provided. The method comprises: determining a configuration information (ID) of a user equipment (UE) based on indication information included in a synchronization signal and physical broadcast channel (PBCH) block (SSB), the configuration information corresponding to a first value or a second value; determining, based on the configuration information, an operation mode to identify a UE transmit (Tx) scheme and a UE receive (Rx) scheme, wherein the operation mode comprises a first operation mode corresponding to the first value or a second operation mode corresponding to the second value; and transmitting or receive signals based on the determined operation mode.

20 Claims, 14 Drawing Sheets

(51) Int. Cl.
*H04W 74/00* (2009.01)
*H04W 74/0833* (2024.01)

(58) Field of Classification Search
CPC ............. H04W 74/0836; H04W 48/12; H04B 7/0695; H04B 7/088; H04B 7/0617
See application file for complete search history.

(56) References Cited

U.S. PATENT DOCUMENTS

| | | | | |
|---|---|---|---|---|
| 2020/0099491 | A1* | 3/2020 | Qin | H04W 16/28 |
| 2021/0329574 | A1 | 10/2021 | Ang et al. | |
| 2021/0336687 | A1 | 10/2021 | Pezeshki et al. | |
| 2022/0029688 | A1 | 1/2022 | Pezeshki et al. | |
| 2022/0278885 | A1 | 9/2022 | Deng et al. | |
| 2022/0345908 | A1 | 10/2022 | Takano et al. | |
| 2024/0007242 | A1* | 1/2024 | Xiong | H04L 1/08 |
| 2024/0196329 | A1* | 6/2024 | Bar-Or Tillinger | H04W 52/0235 |

FOREIGN PATENT DOCUMENTS

| | | | |
|---|---|---|---|
| WO | 2021109915 | A1 | 6/2021 |
| WO | 2021189398 | A1 | 9/2021 |
| WO | 2022079608 | A1 | 4/2022 |
| WO | 2022087190 | A1 | 4/2022 |

OTHER PUBLICATIONS

Supplementary European Search Report dated Feb. 2, 2026, in connection with European Application No. 23907702.7, 10 pages.
"3rd Generation Partnership Project; Technical Specification Group Radio Access Network; NR; Physical channels and modulation (Release 16)", 3GPP TS 38.211 V16.6.0, Jun. 2021, 134 pages.
"3rd Generation Partnership Project; Technical Specification Group Radio Access Network; NR; Multiplexing and channel coding (Release 16)", 3GPP TS 38.212 V16.6.0, Jun. 2021, 153 pages.
"3rd Generation Partnership Project; Technical Specification Group Radio Access Network; NR; Physical layer procedures for control (Release 16)", 3GPP TS 38.213 V16.6.0, Jun. 2021, 187 pages.
"3rd Generation Partnership Project; Technical Specification Group Radio Access Network; NR; Physical layer procedures for data (Release 16)", 3GPP TS 38.214 V16.6.0, Jun. 2021, 172 pages.
"3rd Generation Partnership Project; Technical Specification Group Radio Access Network; NR; Radio Resource Control (RRC) protocol specification (Release 16)", 3GPP TS 38.331 V16.5.0, Jun. 2021, 964 pages.
"3rd Generation Partnership Project; Technical Specification Group Radio Access Network; NR; Medium Access Control (MAC) protocol specification (Release 16)", 3GPP TS 38.321 V16.5.0, Jun. 2021, 157 pages.

* cited by examiner

MULTIPLE BEAM OPERATIONS IN WIRELESS COMMUNICATION SYSTEMS

CROSS-REFERENCE TO RELATED APPLICATIONS AND CLAIM OF PRIORITY

The present application claims priority to U.S. Provisional Patent Application No. 63/434,741, filed on Dec. 22, 2022. The contents of the above-identified patent documents are incorporated herein by reference.

TECHNICAL FIELD

The present disclosure relates generally to wireless communication systems and, more specifically, the present disclosure relates to multiple beam operations in wireless communication systems.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

The present disclosure relates to wireless communication systems and, more specifically, the present disclosure relates to multiple beam operations in wireless communication systems.

In one embodiment, a base station (BS) is provided. The BS comprises a processor configured to: determine a configuration information of a user equipment (UE) based on indication information included in a synchronization signal and physical broadcast channel (PBCH) block (SSB), the configuration information corresponding to a first value or a second value, and determine, based on the configuration information, an operation mode to identify a UE transmit (Tx) scheme and a UE receive (Rx) scheme, wherein the operation mode comprises a first operation mode corresponding to the first value or a second operation mode corresponding to the second value. The BS further comprises a transceiver operably coupled to the processor, the transceiver configured to transmit or receive signals based on the determined operation mode.

In another embodiment, a UE is provided. The UE comprises a processor and a transceiver configured to receive or transmit signals, from a BS or to the BS, based on an operation mode comprising a first operation mode corresponding to a first value or a second operation mode corresponding to a second value, wherein the operation mode is identified by a UE Tx scheme and a UE Rx scheme, wherein a configuration information including the first value and the second value is identified based on indication information included in an SSB.

In yet another embodiment, a method of a BS is provided. The method comprises: determining a configuration information of a UE based on indication information included in an SSB, the configuration information corresponding to a first value or a second value; determining, based on the configuration information, an operation mode to identify a UE Tx scheme and a UE Rx scheme, wherein the operation mode comprises a first operation mode corresponding to the first value or a second operation mode corresponding to the second value; and transmitting or receive signals based on the determined operation mode.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIG. 1 through FIG. 14, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive MIMO, full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancelation and the like.

The discussion of 5G systems and frequency bands associated therewith is for reference as certain embodiments of the present disclosure may be implemented in 5G systems. However, the present disclosure is not limited to 5G systems, or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

Figure 1:
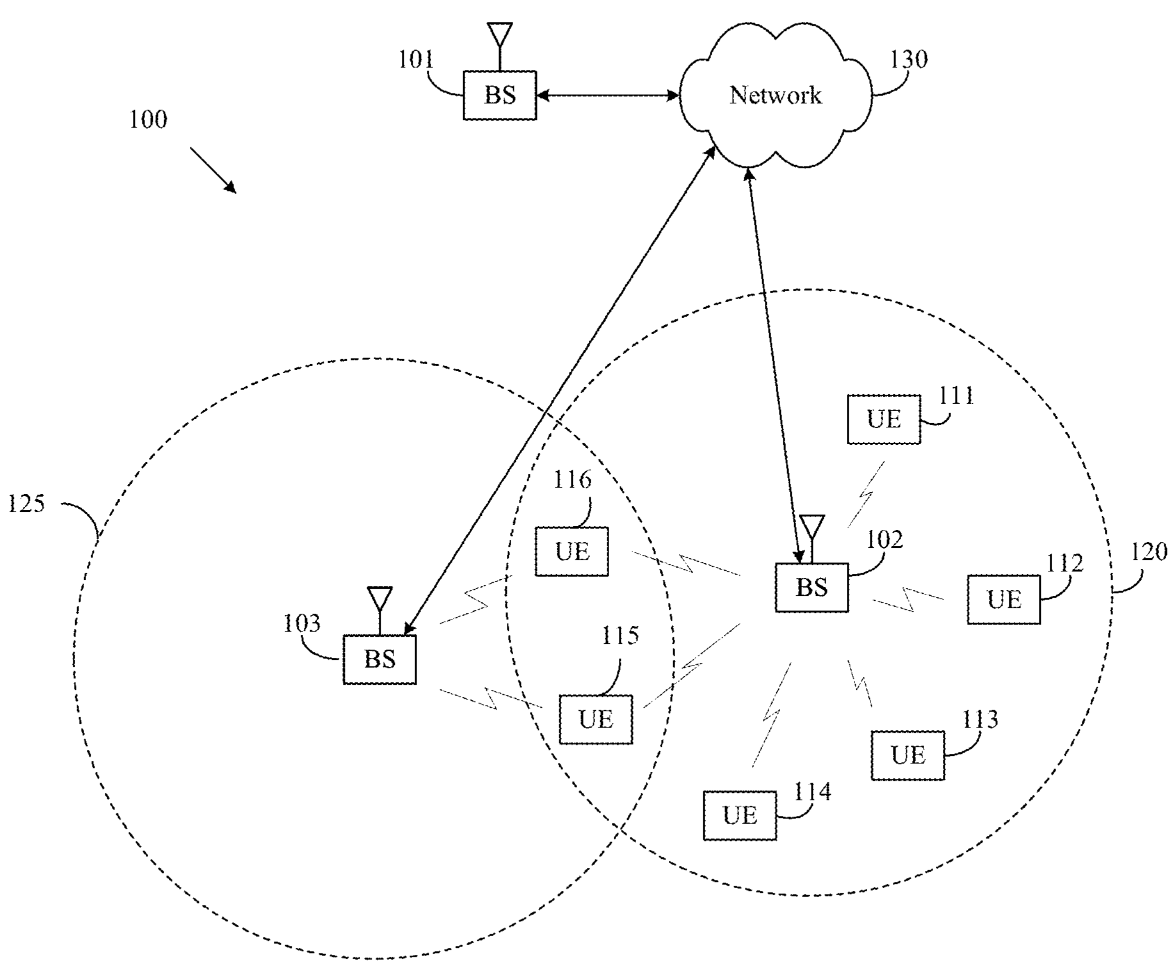
FIG. 1 illustrates an example of wireless network according to embodiments of the present disclosure.
Figure 2:
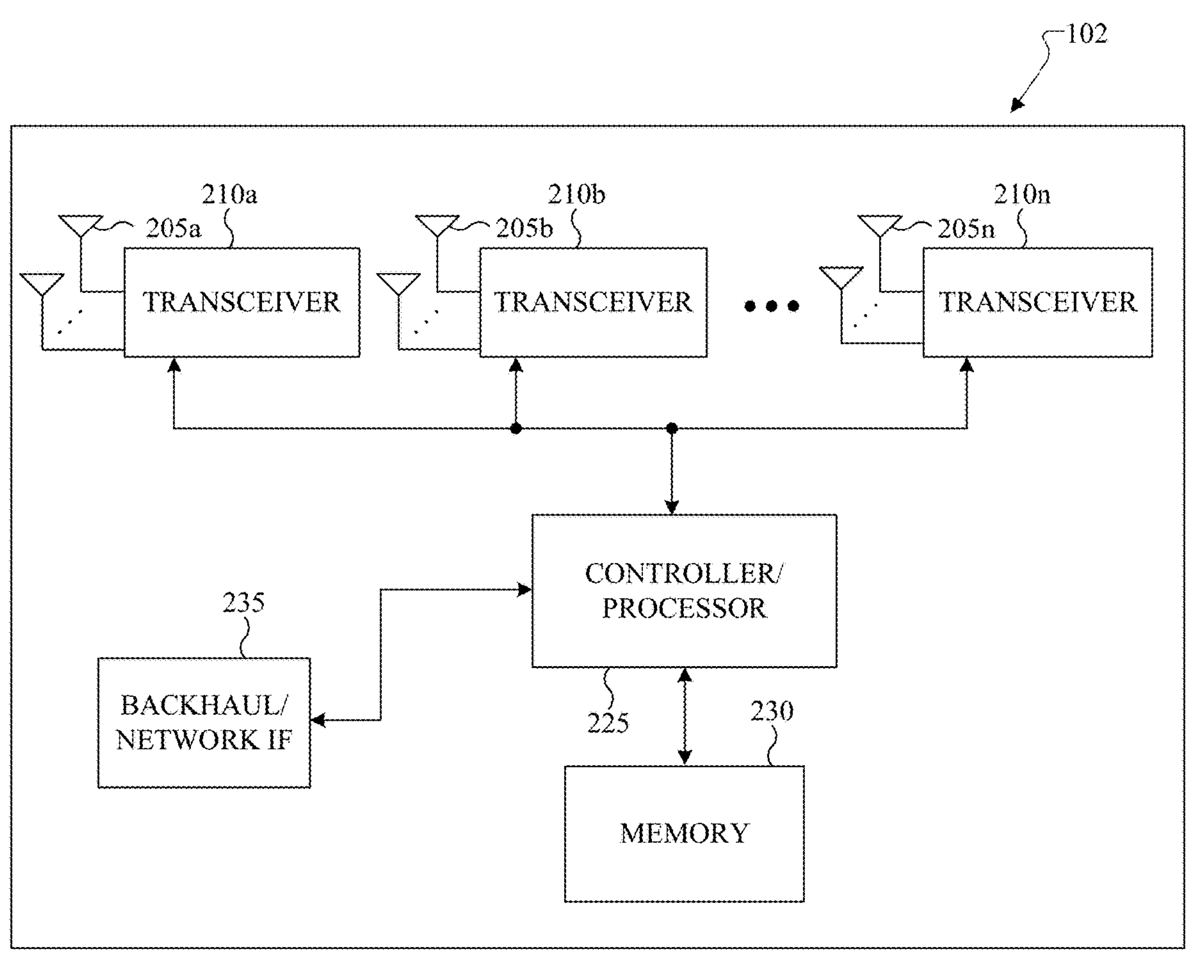
FIG. 2 illustrates an example of gNB according to embodiments of the present disclosure.
Figure 3:
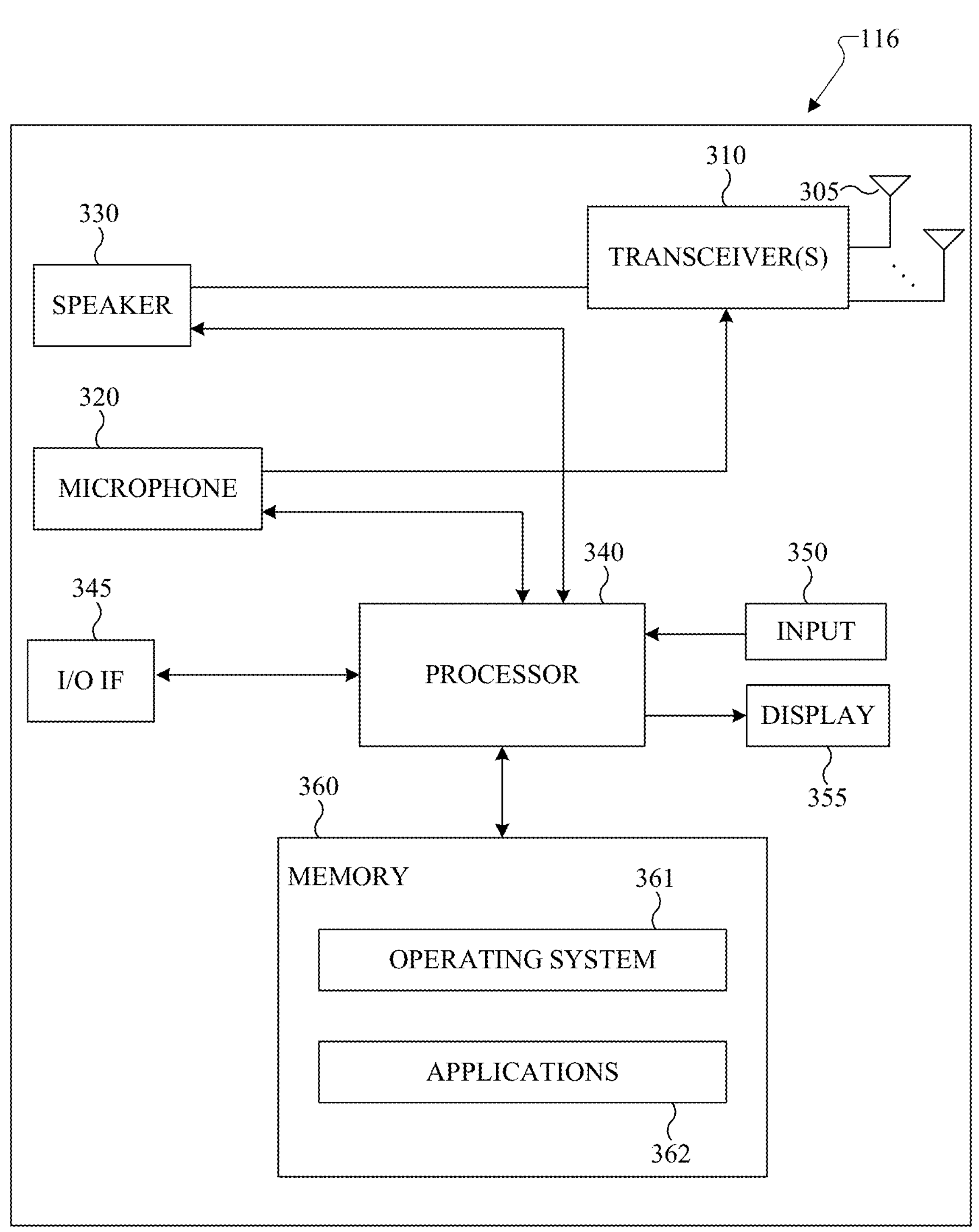
FIG. 3 illustrates an example of UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise; a UE 113, which may be a WiFi hotspot; a UE 114, which may be located in a first residence; a UE 115, which may be located in a second residence; and a UE 116, which may be a mobile device, such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3rd generation partnership project (3GPP) NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, for multiple beam operations in wireless communication systems. In certain embodiments, and one or more of the gNBs 101-103 includes circuitry, programing, or a combination thereof, to support multiple beam operations in wireless communication systems.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205*a*-205*n*, multiple transceivers 210*a*-210*n*, a controller/processor 225, a memory 230, and a backhaul or network interface 235.

The transceivers 210*a*-210*n* receive, from the antennas 205*a*-205*n*, incoming RF signals, such as signals transmitted by UEs in the network 100. The transceivers 210*a*-210*n* down-convert the incoming RF signals to generate IF or baseband signals. The IF or baseband signals are processed by receive (RX) processing circuitry in the transceivers 210*a*-210*n* and/or controller/processor 225, which generates processed baseband signals by filtering, decoding, and/or digitizing the baseband or IF signals. The controller/processor 225 may further process the baseband signals.

Transmit (TX) processing circuitry in the transceivers 210*a*-210*n* and/or controller/processor 225 receives analog or digital data (such as voice data, web data, e-mail, or interactive video game data) from the controller/processor 225. The TX processing circuitry encodes, multiplexes, and/or digitizes the outgoing baseband data to generate processed baseband or IF signals. The transceivers 210*a*-210*n* up-converts the baseband or IF signals to RF signals that are transmitted via the antennas 205*a*-205*n*.

The controller/processor 225 can include one or more processors or other processing devices that control the overall operation of the gNB 102. For example, the controller/processor 225 could control the reception of UL channel signals and the transmission of DL channel signals by the transceivers 210*a*-210*n* in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205*a*-205*n* are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as processes to support multiple beam operations in wireless communication systems. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a wireless communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes antenna(s) 305, a transceiver(s) 310, and a microphone 320. The UE 116 also includes a speaker 330, a processor 340, an input/output (I/O) interface (IF) 345, an input 350, a display 355, and a memory 360. The memory 360 includes an operating system (OS) 361 and one or more applications 362.

The transceiver(s) 310 receives, from the antenna 305, an incoming RF signal transmitted by a gNB of the network 100. The transceiver(s) 310 down-converts the incoming RF signal to generate an intermediate frequency (IF) or baseband signal. The IF or baseband signal is processed by RX processing circuitry in the transceiver(s) 310 and/or processor 340, which generates a processed baseband signal by filtering, decoding, and/or digitizing the baseband or IF signal. The RX processing circuitry sends the processed baseband signal to the speaker 330 (such as for voice data) or is processed by the processor 340 (such as for web browsing data).

TX processing circuitry in the transceiver(s) 310 and/or processor 340 receives analog or digital voice data from the microphone 320 or other outgoing baseband data (such as web data, e-mail, or interactive video game data) from the processor 340. The TX processing circuitry encodes, multiplexes, and/or digitizes the outgoing baseband data to generate a processed baseband or IF signal. The transceiver (s) 310 up-converts the baseband or IF signal to an RF signal that is transmitted via the antenna(s) 305.

The processor 340 can include one or more processors or other processing devices and execute the OS 361 stored in the memory 360 in order to control the overall operation of the UE 116. For example, the processor 340 could control the reception of DL channel signals and the transmission of UL channel signals by the transceiver(s) 310 in accordance with well-known principles. In some embodiments, the processor 340 includes at least one microprocessor or microcontroller.

The processor 340 is also capable of executing other processes and programs resident in the memory 360, such as processes for multiple beam operations in wireless communication systems.

The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input 350 and the display 355*m* which includes for example, a touchscreen, keypad, etc., The operator of the UE 116 can use the input 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). In another example, the transceiver(s) 310 may include any number of transceivers and signal processing chains and may be connected to any number of antennas. Also, while FIG. 3 illustrates the UE 116 configured as a mobile telephone or smartphone, UEs could be configured to operate as other types of mobile or stationary devices.

Figures 4, 5:
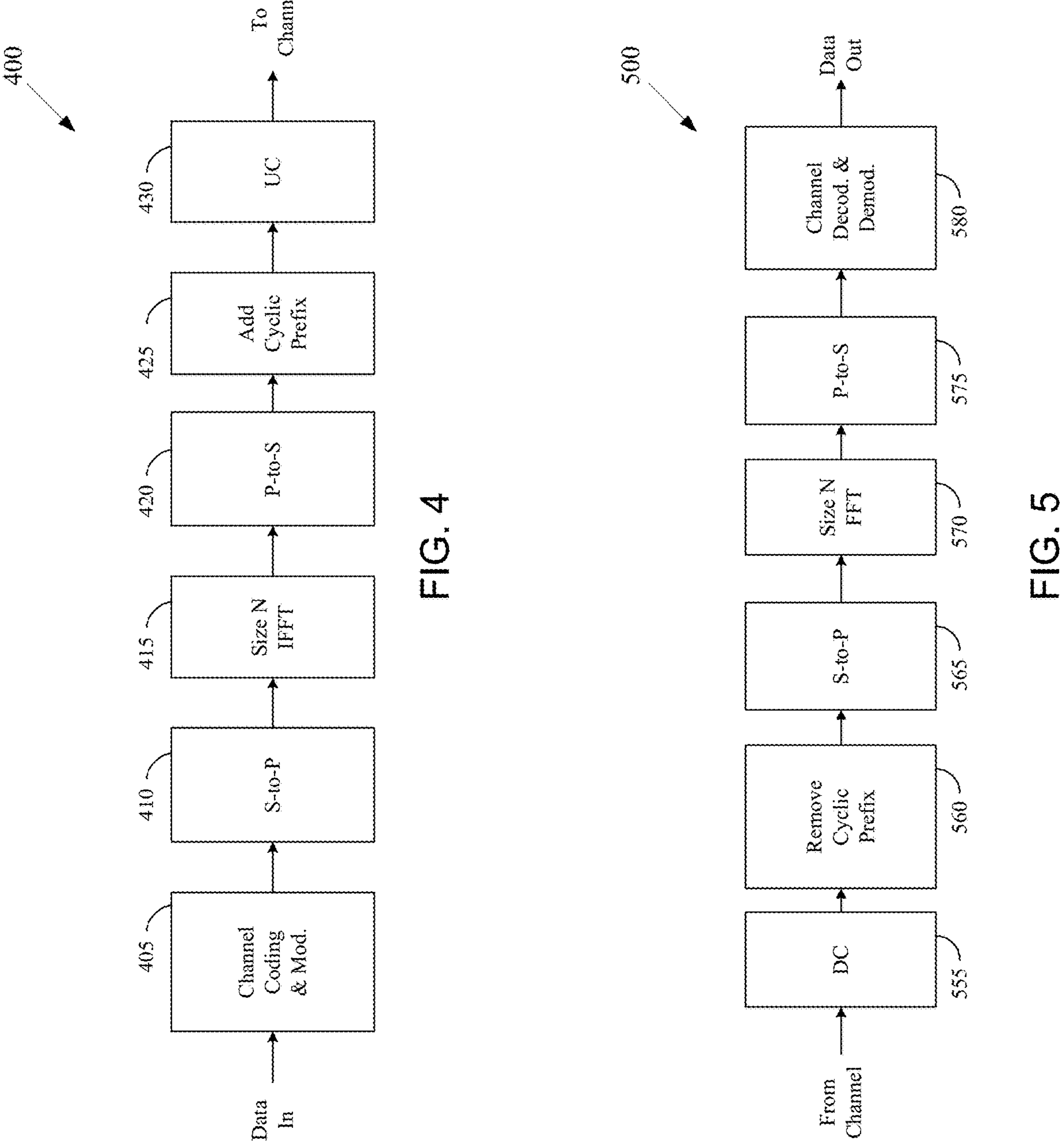
FIGS. 4 and 5 illustrate example of wireless transmit and receive paths according to this disclosure.

FIG. 4 and FIG. 5 illustrate example wireless transmit and receive paths according to this disclosure. In the following description, a transmit path 400 may be described as being implemented in a gNB (such as the gNB 102), while a receive path 500 may be described as being implemented in a UE (such as a UE 116). However, it may be understood that the receive path 500 can be implemented in a gNB and that the transmit path 400 can be implemented in a UE. In some embodiments, the receive path 500 is configured to support multiple beam operations in wireless communication systems.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a downconverter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 4, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols.

The serial-to-parallel block 410 converts (such as de-multiplexes) the serial modulated symbols to parallel data in order to generate N parallel symbol streams, where N is the IFFT/FFT size used in the gNB 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the gNB 102 arrives at the UE 116 after passing through the wireless channel, and reverse operations to those at the gNB 102 are performed at the UE 116.

As illustrated in FIG. 5, the downconverter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the gNBs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to the gNBs 101-103 and may implement the receive path 500 for receiving in the downlink from the gNBs 101-103.

Each of the components in FIG. 4 and FIG. 5 can be implemented using only hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 415 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

A unit for DL signaling or for UL signaling on a cell is referred to as a slot and can include one or more symbols. A bandwidth (BW) unit is referred to as a resource block (RB). One RB includes a number of sub-carriers (SCs). For example, a slot can have duration of one millisecond and an RB can have a bandwidth of 180 KHz and include 12 SCs with inter-SC spacing of 15 KHz. A slot can be either full DL slot, or full UL slot, or hybrid slot similar to a special subframe in time division duplex (TDD) systems.

DL signals include data signals conveying information content, control signals conveying DL control information (DCI), and reference signals (RS) that are also known as pilot signals. A gNB transmits data information or DCI through respective physical DL shared channels (PDSCHs) or physical DL control channels (PDCCHs). A PDSCH or a PDCCH can be transmitted over a variable number of slot symbols including one slot symbol. A UE can be indicated a spatial setting for a PDCCH reception based on a configuration of a value for a TCI state of a CORESET where the UE receives the PDCCH. The UE can be indicated a spatial setting for a PDSCH reception based on a configuration by higher layers or based on an indication by a DCI format scheduling the PDSCH reception of a value for a TCI state. The gNB can configure the UE to receive signals on a cell within a DL bandwidth part (BWP) of the cell DL BW.

A gNB transmits one or more of multiple types of RS including channel state information RS (CSI-RS) and demodulation RS (DMRS). A CSI-RS is primarily intended for UEs to perform measurements and provide channel state information (CSI) to a gNB. For channel measurement, non-zero power CSI-RS (NZP CSI-RS) resources are used. For interference measurement reports (IMRs), CSI interference measurement (CSI-IM) resources associated with a zero power CSI-RS (ZP CSI-RS) configuration are used. A CSI process consists of NZP CSI-RS and CSI-IM resources. A UE can determine CSI-RS transmission parameters through DL control signaling or higher layer signaling, such as an radio resource control (RRC) signaling from a gNB. Transmission instances of a CSI-RS can be indicated by DL control signaling or configured by higher layer signaling. A DMRS is transmitted only in the BW of a respective PDCCH or PDSCH and a UE can use the DMRS to demodulate data or control information.

UL signals also include data signals conveying information content, control signals conveying UL control information (UCI), DMRS associated with data or UCI demodulation, sounding RS (SRS) enabling a gNB to perform UL channel measurement, and a random access (RA) preamble enabling a UE to perform random access. A UE transmits data information or UCI through a respective physical UL shared channel (PUSCH) or a physical UL control channel (PUCCH). A PUSCH or a PUCCH can be transmitted over a variable number of slot symbols including one slot symbol. The gNB can configure the UE to transmit signals on a cell within an UL BWP of the cell UL BW.

UCI includes hybrid automatic repeat request acknowledgement (HARQ-ACK) information, indicating correct or incorrect detection of data transport blocks (TBs) in a PDSCH, scheduling request (SR) indicating whether a UE has data in the buffer of UE, and CSI reports enabling a gNB to select appropriate parameters for PDSCH or PDCCH transmissions to a UE. HARQ-ACK information can be configured to be with a smaller granularity than per TB and can be per data code block (CB) or per group of data CBs where a data TB includes a number of data CBs.

A CSI report from a UE can include a channel quality indicator (CQI) informing a gNB of a largest modulation and coding scheme (MCS) for the UE to detect a data TB with a predetermined block error rate (BLER), such as a 10% BLER, of a precoding matrix indicator (PMI) informing a gNB how to combine signals from multiple transmitter antennas in accordance with a MIMO transmission principle, and of a rank indicator (RI) indicating a transmission rank for a PDSCH. UL RS includes DMRS and SRS. DMRS is transmitted only in a BW of a respective PUSCH or PUCCH transmission. A gNB can use a DMRS to demodulate information in a respective PUSCH or PUCCH. SRS is transmitted by a UE to provide a gNB with an UL CSI and, for a TDD system, an SRS transmission can also provide a PMI for DL transmission. Additionally, in order to establish synchronization or an initial higher layer connection with a gNB, a UE can transmit a physical random-access channel.

In the present disclosure, a beam is determined by either of: (1) a TCI state, which establishes a quasi-colocation (QCL) relationship between a source reference signal (e.g., synchronization signal/physical broadcasting channel (PBCH) block (SSB) and/or CSI-RS) and a target reference signal; or (2) spatial relation information that establishes an association to a source reference signal, such as SSB or CSI-RS or SRS. In either case, the ID of the source reference signal identifies the beam.

The TCI state and/or the spatial relation reference RS can determine a spatial Rx filter for reception of downlink channels at the UE, or a spatial Tx filter for transmission of uplink channels from the UE.

Rel. 14 LTE and Rel. 15 NR support up to 32 CSI-RS antenna ports which enable an eNB to be equipped with a large number of antenna elements (such as 64 or 128). In this case, a plurality of antenna elements is mapped onto one CSI-RS port. For mmWave bands, although the number of antenna elements can be larger for a given form factor, the number of CSI-RS ports—which can correspond to the number of digitally precoded ports—tends to be limited due to hardware constraints (such as the feasibility to install a large number of ADCs/DACs at mmWave frequencies) as illustrated in FIG. 6.

Figure 6:
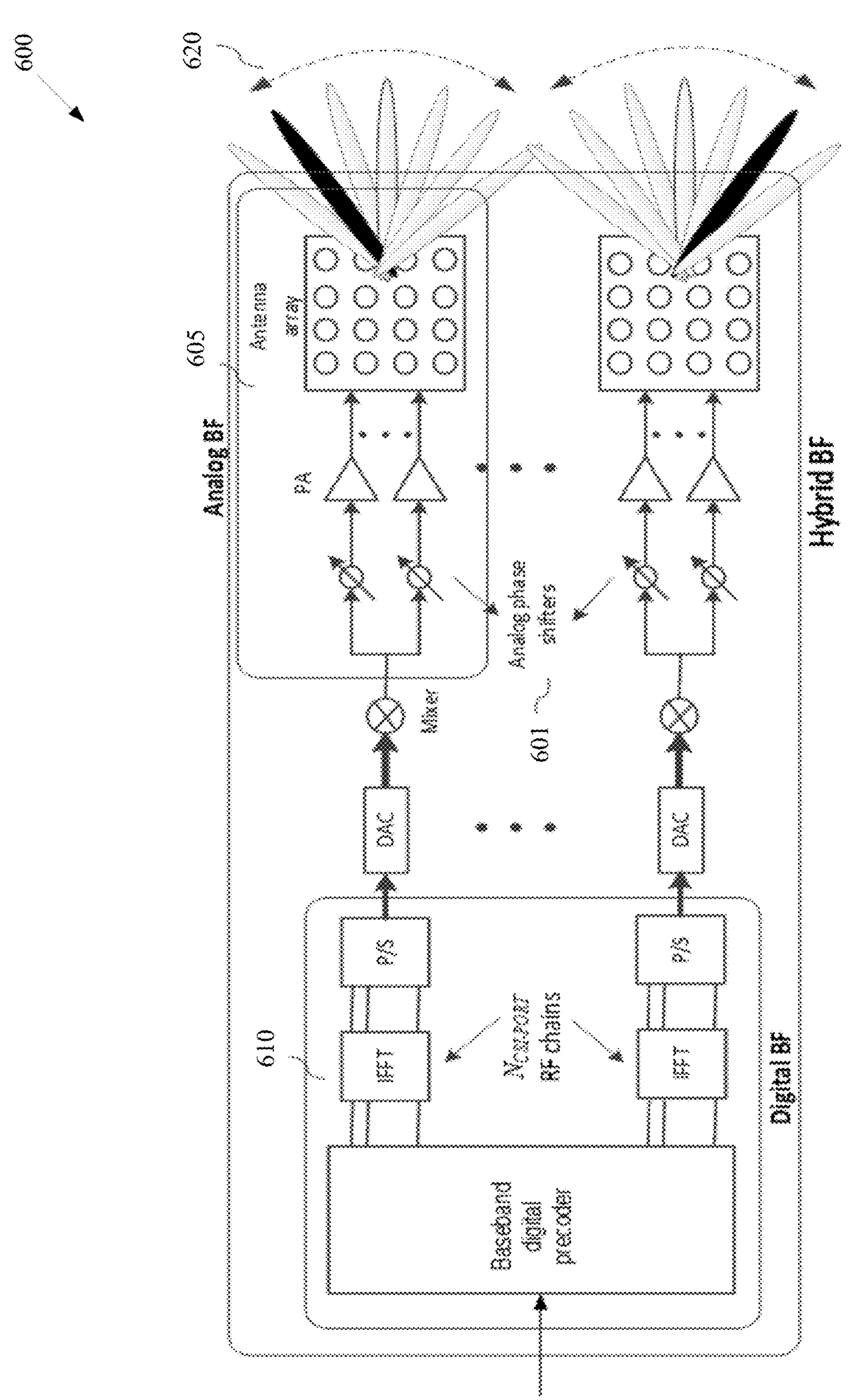
FIG. 6 illustrates an example of antenna structure according to embodiments of the present disclosure.

FIG. 6 illustrates an example antenna structure 600 according to embodiments of the present disclosure. An embodiment of the antenna structure 600 shown in FIG. 6 is for illustration only.

In this case, one CSI-RS port is mapped onto a large number of antenna elements which can be controlled by a bank of analog phase shifters 601. One CSI-RS port can then correspond to one sub-array which produces a narrow analog beam through analog beamforming 605. This analog beam can be configured to sweep across a wider range of angles 620 by varying the phase shifter bank across symbols or subframes. The number of sub-arrays (equal to the number of RF chains) is the same as the number of CSI-RS ports $N_{CSI-PORT}$. A digital beamforming unit 610 performs a linear combination across $N_{CSI-PORT}$ analog beams to further increase precoding gain. While analog beams are wideband (hence not frequency-selective), digital precoding can be varied across frequency sub-bands or resource blocks. Receiver operation can be conceived analogously.

Since the aforementioned system utilizes multiple analog beams for transmission and reception (wherein one or a small number of analog beams are selected out of a large number, for instance, after a training duration—to be performed from time to time), the term "multi-beam operation" is used to refer to the overall system aspect. This includes, for the purpose of illustration, indicating the assigned DL or UL TX beam (also termed "beam indication"), measuring at least one reference signal for calculating and performing beam reporting (also termed "beam measurement" and "beam reporting," respectively), and receiving a DL or UL transmission via a selection of a corresponding RX beam.

The aforementioned system is also applicable to higher frequency bands such as >52.6 GHz. In this case, the system can employ only analog beams. Due to the O2 absorption loss around 60 GHz frequency (~10 dB additional loss @100 m distance), larger number of and sharper analog beams (hence larger number of radiators in the array) may be needed to compensate for the additional path loss.

Figure 7:
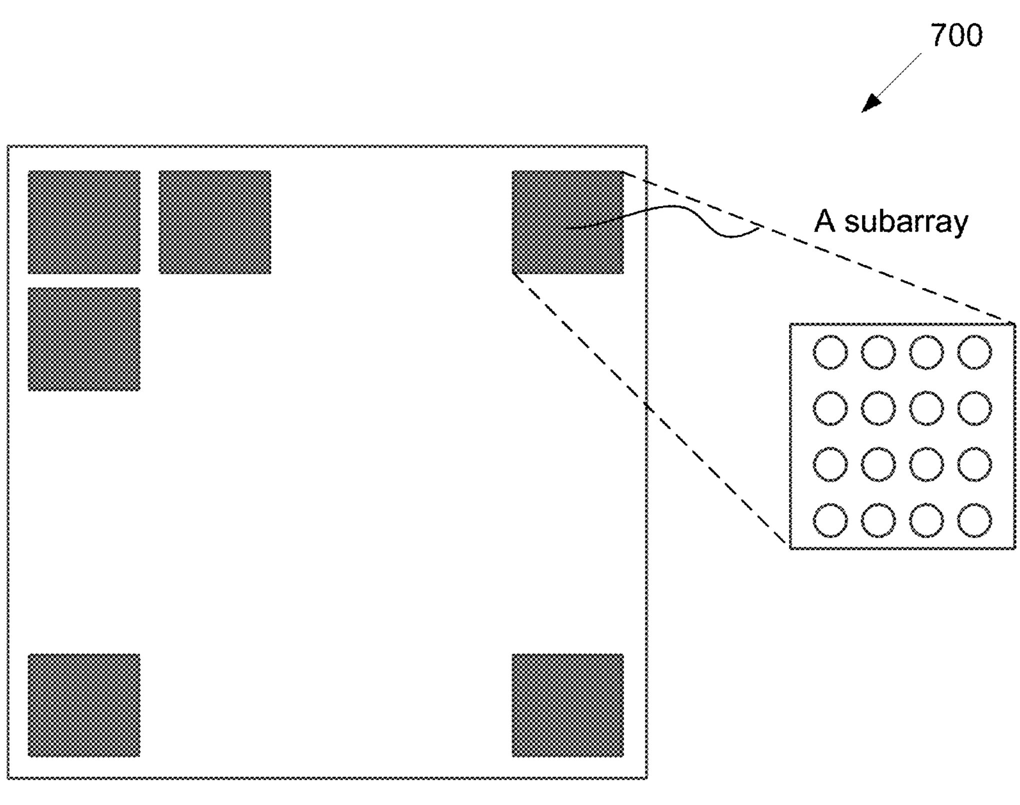
FIG. 7 illustrates an example of an antenna panel comprising NT antenna elements according to embodiments of the present disclosure.

FIG. 7 illustrates an example of an antenna panel comprising $N_T$ antenna elements 700 according to embodiments of the present disclosure. An embodiment of the antenna panel comprising $N_T$ antenna elements 700 shown in FIG. 7 is for illustration only.

FIG. 7 describes an antenna panel comprising $N_T$ antenna elements, which are partitioned into subarrays of equal number of elements, say $N_A$ antenna elements. The total number of subarrays is denoted as $N_D$, and $N_D=N_T/N_A$.

Figure 8:
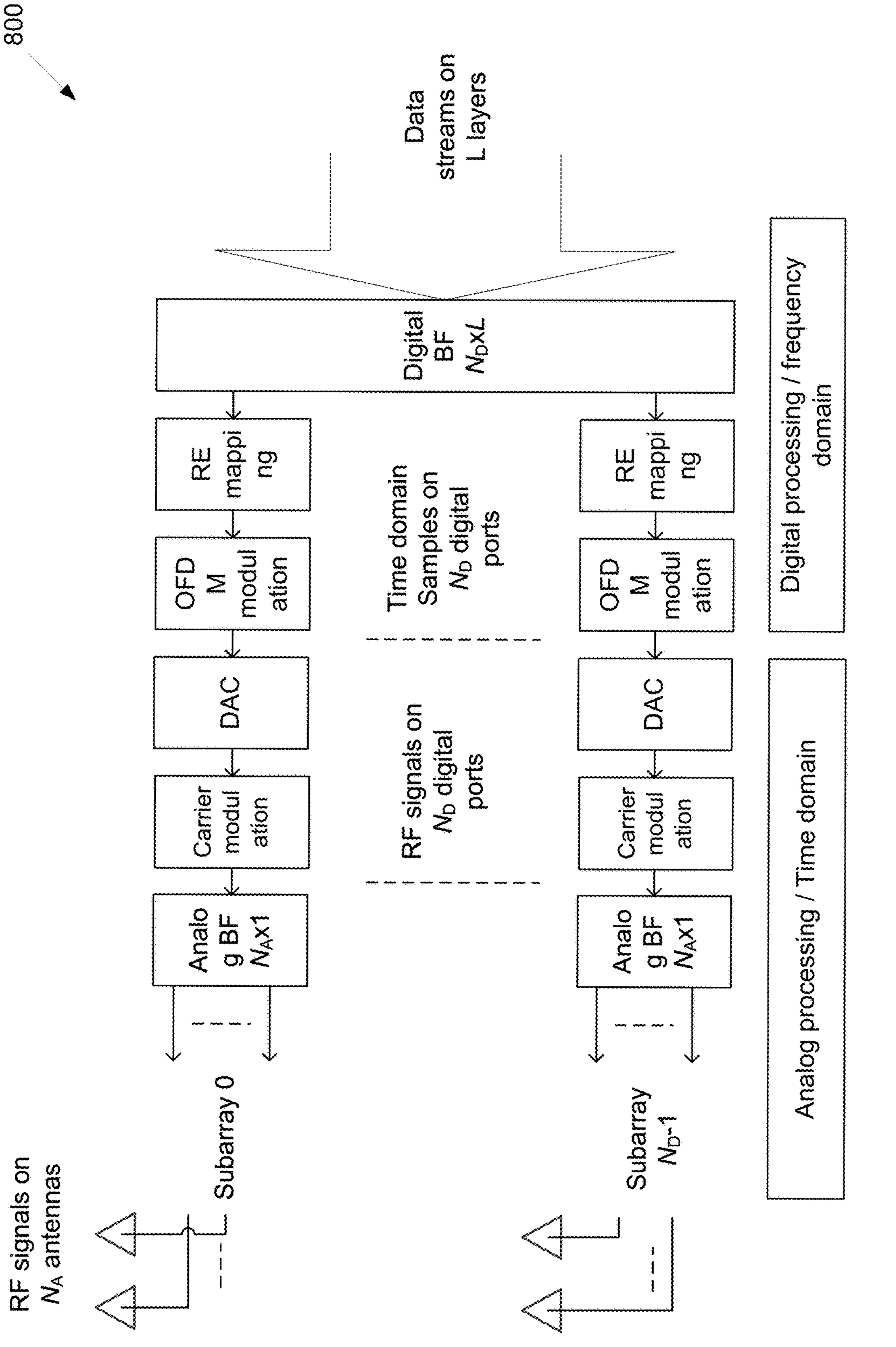
FIG. 8 illustrates an example of a RF frontend and baseband implementation for a base station according to embodiments of the present disclosure.

FIG. 8 illustrates an example of RF frontend and baseband implementation for a base station 800 according to embodiments of the present disclosure. An embodiment of the RF frontend and baseband implementation for a base station 800 shown in FIG. 8 is for illustration only.

FIG. 8 shows a RF frontend and baseband implementation for a base station equipped with the antenna panel in FIG. 7. This RF frontend is one possible implementation of hybrid analog-digital beamforming. The $N_T$ RF signals to be emitted from the antenna panel is constructed according to FIG. 8.

Starting from the right, L data streams, or L sequences of modulation symbols are provided to digital beamformer (BF), which may convert L streams to $N_D$ data streams, with multiplying a digital precoder $$p_k^D,$$

whose dimension is $N_D \times L$, on the resource elements comprising PRB bundle k, wherein k=0, . . . , $N_{PRB-bundles}-1$, and $N_{PRB-bundles}$ is the total number of PRB bundles that the data stream is mapped to.

The modulation symbols on each of $N_D$ data streams are then mapped to resource elements, go through OFDM modulation, and are finally converted to time domain samples. These time domain samples are converted to analog, go through carrier modulation, and an analog signal is obtained for each of these $N_D$ paths.

Then, the analog signal goes through analog BF block, where an analog precoder $$p_d^A$$

of size $N_A \times 1$ is applied for path d, where d=0, . . . , $N_D-1$. Applying analog BFs for the signals on all the $N_D$ paths, the RF signals on $N_T=N_A \times N_D$ antenna elements are constructed.

An upper mid band (7 to 15 GHz) is being considered for a promising carrier BW for 6G wireless communications. As carrier frequency is much higher than the conventional 5G C-band (3.5 GHz), the wavelength (lambda) is much shorter, and hence the number of antennas that can be packed with 0.5 lambda spacing in the same antenna form factor is much more in the upper mid band than in the C band. This gives opportunity to support higher-order spatial multiplexing in upper-mid band than in C-band for the MIMO transmission schemes, like SU-MIMO or MU-MIMO, when mobile locations are favorable to the MIMO spatial operations, e.g., where Rx SINR or RSRP is high.

On the other hand, higher carrier frequency also means higher pathloss, and the signals emitted by the base station attenuates quicker in distance in upper mid bands than in C bands. Hence, without extra processing on the base station side, it is expected that the cell coverage is more limited in upper mid bands than C bands. One promising base station side processing to combat the more aggressive pathloss is beamforming and beam sweeping, similarly as utilized in mmWave (28 GHz) 5G wireless communications.

As such, it may have both "blessings" of potential of higher spectral efficiency for cell center users, and "curses" of higher pathloss for cell edge users. This motivates to design the system to support two different operation zones and corresponding operation modes.

Figure 9:
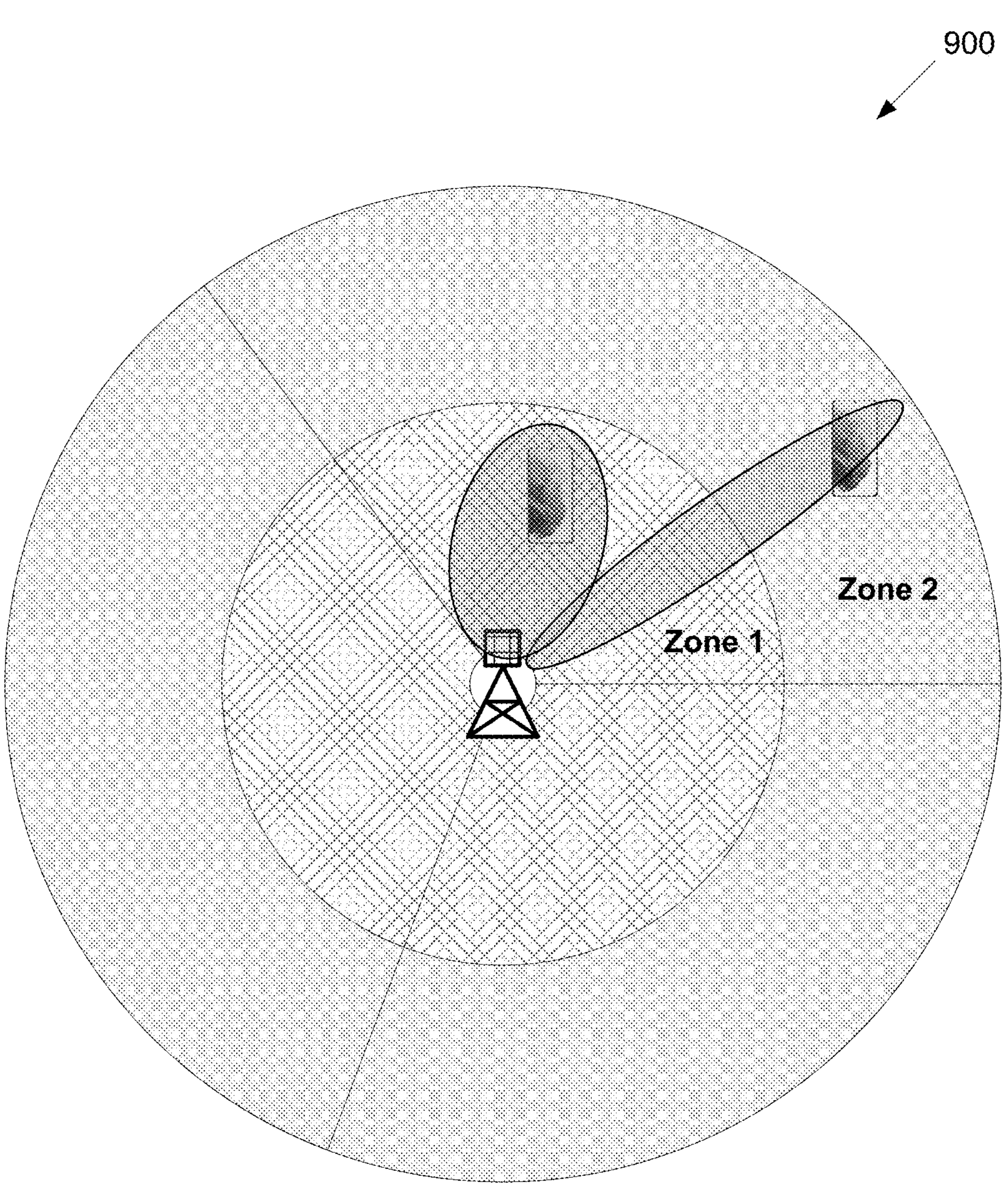
FIG. 9 illustrates an example of zoning of a cell according to embodiments of the present disclosure.

FIG. 9 illustrates an example of zoning of a cell 900 according to embodiments of the present disclosure. An embodiment of the zoning of a cell 900 shown in FIG. 9 is for illustration only.

FIG. 9 shows the zoning of a cell (or a sector) based on some embodiments of the present disclosure. In the figure, two coverage beams, a wide beam and a narrow beam; two zones, zone 1 for cell center and zone 2 for the cell edge; two UEs, one in zone 1 and the other in zone 2, and a base station is illustrated. The base station may comprise multiple sectors, and 3 sectors are illustrated in this figure. Among those 3 sectors, an upper right sector is used for further illustration of the method.

If a UE belongs to a first zone (denoted as zone 1), the UE is considered for higher order SU-MIMO and MU-MIMO operations, for which a coverage beam is wide. If a UE belongs to a second zone (denoted as zone 2), the UE may be served by narrow beams by the base station, to maximize the base station's signal power reaching to the UE. Thereby supporting MIMO spatial multiplexing and beam forming in the same frequency.

Here, the coverage beam implies a beam that is used for basic coverage signal transmissions and receptions, e.g., synchronization signals and PBCH block (SSB), PHY channels (e.g., PDCCH and PDSCH) that are used for broadcast signaling message transmissions (e.g., SIBx) or for initial access signaling (random access response, etc.) are transmitted on the coverage beam.

Furthermore, the subsequent transmissions and receptions at the UE may also be correspondingly determined according to the zone the UE is located in. Towards this purpose, the network may indicate the UE an information on the selected base station operation mode, e.g., either of zone-1 based wide-beam high-order spatial multiplexing operation vs. zone-2 based narrow-beamforming operation.

The control signaling messages and transmission schemes/modes received for the UE in zone 1 are tailored towards C-band massive MIMO like operations, i.e., CSI-RS with high number of ports and related CSI feedback settings are configured, SRS is configured, relatively high-payload DCI that supports higher order MIMO is configured, etc. On the other hand, the control signaling messages and transmission schemes/modes received at the UE in zone 2 are tailored towards mmWave like operations, e.g., multiple CSI-RS resources that are used for L1/L2 beam management that has small, e.g., 2, number of ports, SRS is not configured, relatively low-payload DCI that supports limited order MIMO is configured, etc.

Figure 10:
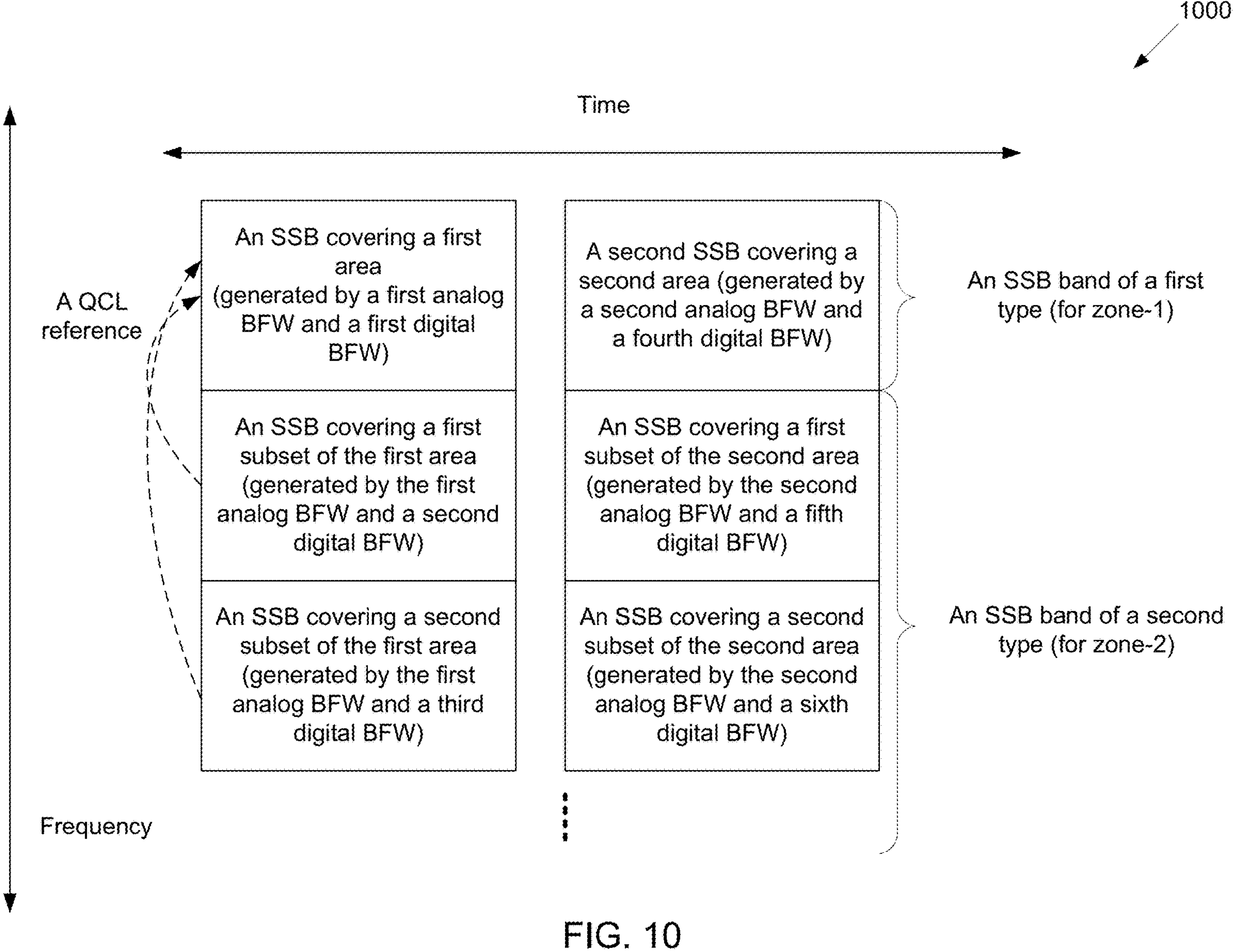
FIG. 10 illustrates an example of time-frequency domain mapping of different zones' SSBs according to embodiments of the present disclosure.

FIG. 10 illustrates an example of time-frequency domain mapping of different zones' SSBs 1000 according to embodiments of the present disclosure. An embodiment of the time-frequency domain mapping of different zones' SSBs 1000 shown in FIG. 10 is for illustration only.

FIG. 10 illustrates time-frequency domain mapping of different zones' SSBs according to some embodiments of the present disclosure.

In some embodiments, SSBs that are used for covering different areas within zone 1 are TDM'ed and transmitted on a same frequency subband, which comprises a number of physical resource blocks (PRBs) of an OFDM symbol grid. These TDM'ed SSBs may be transmitted on different analog beams.

Figure 11A:
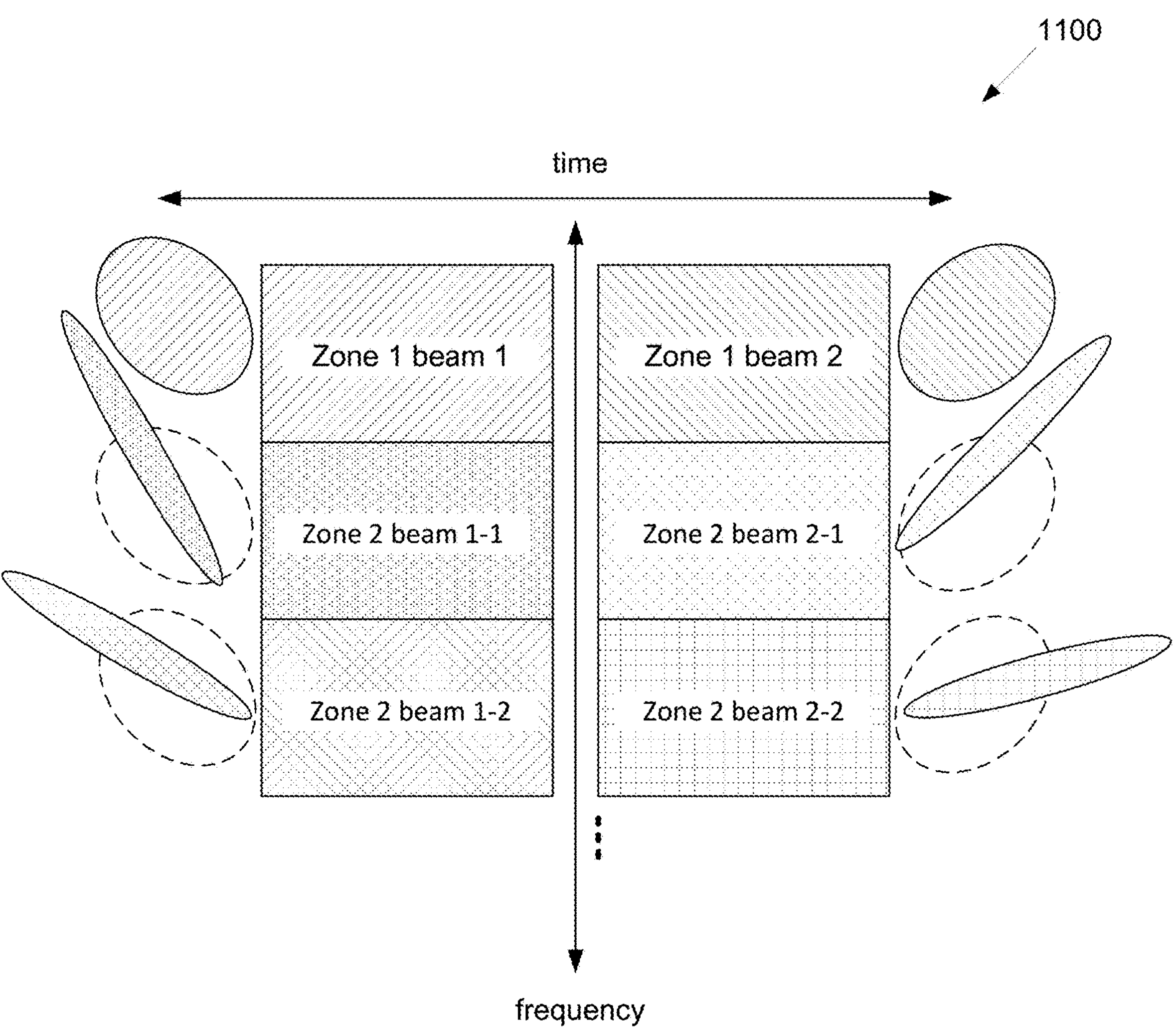
FIG. 11A illustrates an example of beam shapes of the SSBs mapped to different time frequency resources according to some embodiments of the present disclosure.

FIG. 11A illustrates an example of beam shapes of the SSBs mapped to different time frequency resources 11100 according to some embodiments of the present disclosure. An embodiment of the UE method 1100 shown in FIG. 11A is for illustration only.

In some embodiments, as illustrated in FIG. 11A, zone 2 SSBs are FDM'ed with a first SSB that is used for a zone 1 coverage. In the figure, for example, two zone 2 beams, i.e., Zone 2 beam 1-1 and Zone 2 beam 1-2, are FDM'ed with a zone 1 beam, i.e., Zone 1 beam 1. These FDM'ed SSBs are transmitted on a same analog beam as the one used for the first SSB, but on a different digital beam from the one used for the first SSB. Zone 2 SSBs' beams are typically narrower and reaching farther than the first SSB's beam used for zone 1 coverage. These different zone 2 SSBs FDM'ed with the first SSB cover different areas. In other words, the beam sweeping across different areas covering a cell maybe implemented through an FDM approach. As the angular coverage of the first SSB beam is wider than that of zone 2's, a UE may assume that a QCL reference of these zone 2 SSBs is the first SSB, e.g., in spatial, Doppler, delay parameters. This design allows the UE to implement efficient beam search between across the two different zones.

In one embodiment, A UE firstly finds the best zone 1 SSB that gives the highest RSRP, with conducting time domain search on a certain SSB subband. If the RSRP value measured on the SSB is higher than a threshold, the UE uses the SSB as the synchronization reference, and performs subsequent signal reception and transmissions with taking the SSB as QCL reference for corresponding PDCCH DMRS, PDSCH DMRS, CSI-RS receptions. If the RSRP value measured on the SSB is lower than the threshold, the UE continues to measure the RSRPs of those SSBs FDM'ed with the SSB, which correspond to zone 2 SSBs for the SSB, and find the best zone 2 SSB that gives the highest RSRP. The subsequent UE operation will take the best zone 2 SSB as QCL reference for corresponding PDCCH DMRS, PDSCH DMRS and CSI-RS receptions.

In some embodiments, physical random access channel (PRACH) resources are zone-specifically configured, in addition to SSBs are transmitted zone-specifically. SIB1 and MIB are transmitted correspondingly for each SSB, and hence, the PRACH resources that are configured by SIB1 and MIB are also configured SSB and zone specifically. This way, based on the PRACH resource on which the PRACH is detected, the network can identify a zone of a UE selected during the initial access, who transmitted the detected PRACH.

In some embodiments, the network updates the selected zone configuration information for a UE, one zone to another, via an RRC configuration. The network updates the zone configuration information via indicating either an SSB ID, or a zone ID or both. When an SSB ID is indicated, UE infers a zone from the configured SSB ID, according to SSB-zone association information, which is configured by another RRC configuration.

In FIG. 10, the SSB subband in which SSBs are transmitted on zone 1's coverage beams is denoted as an SSB band of a first type; and the SSB subband in which the FDM'ed SSBs are transmitted on zone 2's coverage beams is denoted as an SSB band of a second type.

In some embodiments, each SSB contains an information (a zone configuration information) that indicates whether the SSB is transmitted for zone 1 or zone 2 signal reception and transmissions.

In one example, the information is included in an MIB, which is conveyed on PBCH.

In another example, the information is implicitly conveyed via scrambling ID/sequence ID of a signal, e.g., PBCH DMRS, synchronization signal. In one such method, one set of sequence IDs are associated with a first zone; and another set is associated with a second zone. Such association information can be pre-configured both at the UE and the BS. Upon detecting a signal, the UE infers the zone configuration information based on the association information and the detected sequence ID.

In another example, the information is implicitly conveyed via time-frequency mapping of a signal, e.g., PBCH DMRS, synchronization signal. In one such method, one time-frequency mapping is associated with a first zone; and another is associated with a second zone. Such association information can be pre-configured both at the UE and the BS. Upon detecting a signal, the UE infers the zone configuration information based on the association information and the detected time-frequency resource.

Upon identifying a zone configuration information of the detected SSB that will be used as a synchronization reference for subsequent operations, the UE interprets information of subsequent configuration messages differently, according to the value of the zone configuration information (or denoted as zone).

In some embodiments, each SSB furthermore comprises an SSB time/frequency configuration information that indicates time/frequency configuration information of the SSB and of all the SSBs transmitted within the same carrier. Such time/frequency configuration information includes at least one of time/frequency location index (or indices) of the current SSB, a total number of FDM'ed SSBs, and a total number of TDM'ed SSBs.

In one example, the time/frequency configuration information is included in an MIB, which is conveyed on PBCH.

In another example, the time/frequency configuration information is jointly coded with the zone configuration information.

In some embodiments, UE is pre-configured with a mapping table to map N numbers to N sets of time-frequency locations of the SSBs in the memory. Upon receiving the time/frequency configuration information conveyed as a number selected from the numbers, the UE finds one set from the N sets, i.e., the NW configured time-frequency SSB locations, based on the mapping table in the memory.

In some embodiments, the time/frequency configuration information of the UE's detected SSB and other SSBs in the same carrier is included in SIB.

In one example, the network indicates (1) an absolute frequency location, $f_0$, of the one of these SSBs, which is referred to as a reference SSB; and (2) an integer frequency offset, o, for the currently detected SSB. The UE finds the absolute frequency location of the currently detected SSB using these two information elements, e.g., $f=f_0+o\cdot f_\Delta$, wherein the absolute frequency location of the current SSB is f, and $f_\Delta$ is the frequency step size. In one method, these parameters are pre-configured. In another method, they are configured via broadcast signaling.

In one example, UE is pre-configured with an information of absolute time location (e.g., slot number and the first OFDM symbol number) of the one of the SSBs, which is referred to as a reference SSB; and obtains another information of an integer time offset (e.g., in terms of number of OFDM symbols) for the currently detected SSB from the detected SSB. The UE finds the absolute frequency location of the currently detected SSB using these two information elements, e.g., $l=l_0+o\cdot l_\Delta$, wherein the absolute frequency location of the current SSB is l, the reference SSB's time location is $l_0$, o is an integer offset, and $l_\Delta$ is the time step size. In one method, these parameters are pre-configured. In another method, they are configured via broadcast signaling.

Figure 11B:
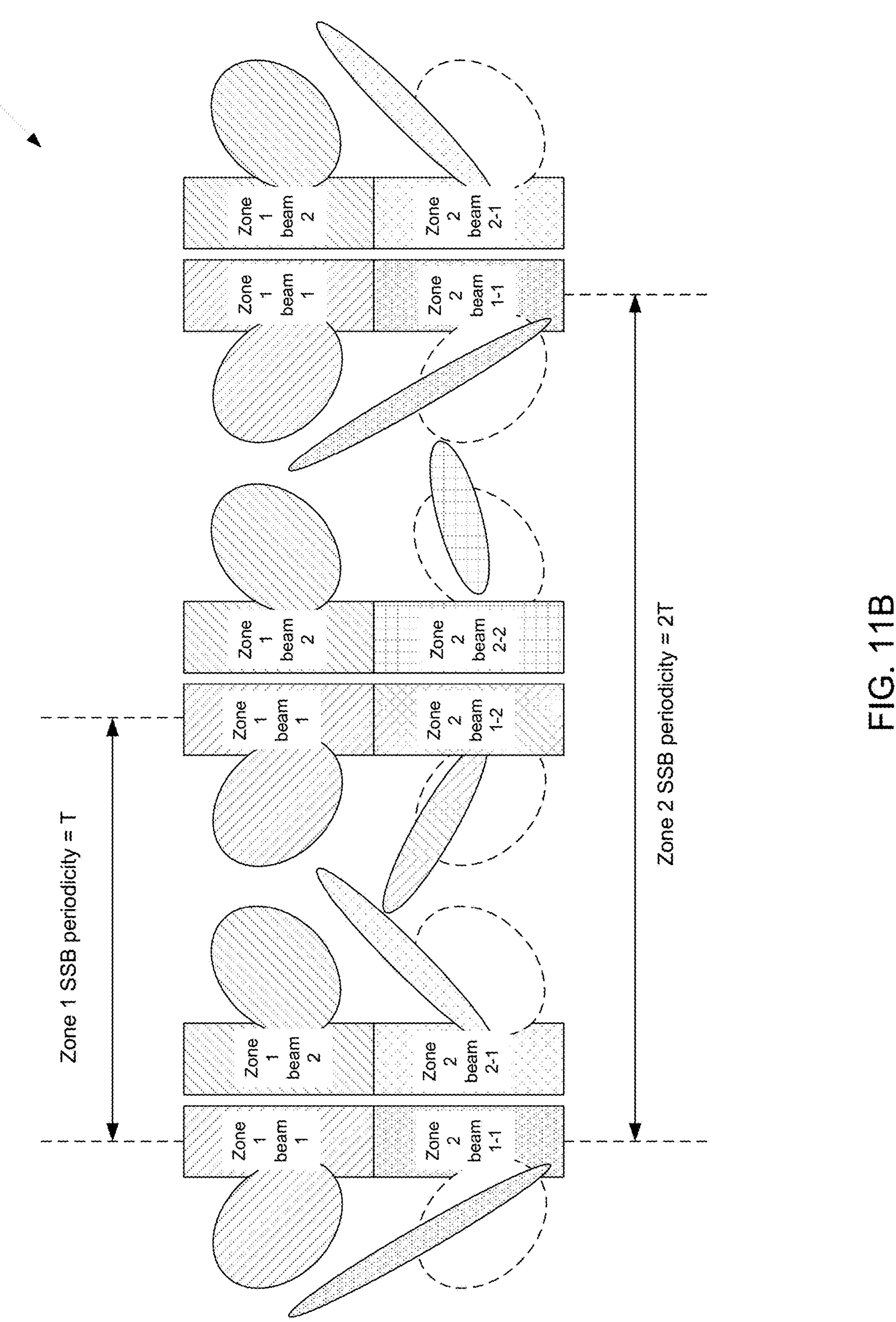
FIG. 11B illustrates an example of the beam shapes of the SSBs mapped to different time frequency resources according to some embodiments of the present disclosure.

FIG. 11B illustrates an example of the beam shapes of the SSBs mapped to different time frequency resources 1150 according to some embodiments of the present disclosure. An embodiment of the UE method 1150 shown in FIG. 11B is for illustration only.

FIG. 11B illustrates the beam shapes of the SSBs mapped to different time frequency resources according to some embodiments of the current invention. Differently from FIG. 11A, the SSBs on a zone 2 beam are transmitted less frequently with higher periodicity (e.g., with periodicity 2T) than SSBs on a zone 1 beam (e.g., with periodicity 1T). In this case, UE is configured to search the SSBs with two different periodicity hypotheses, 1T and 2T. If an SSB is found with the periodicity hypothesis of 1T, the SSB is identified as zone 1 SSB, and if the SSB is found with the periodicity hypothesis of 2T, the SSB is identified as zone 2 SSB. This method can allow for the network to improve the coverage of the SSBs by applying higher power boosting on the SSBs scheduled on the same OFDM symbols than the configuration in FIG. 11A.

Figure 12:
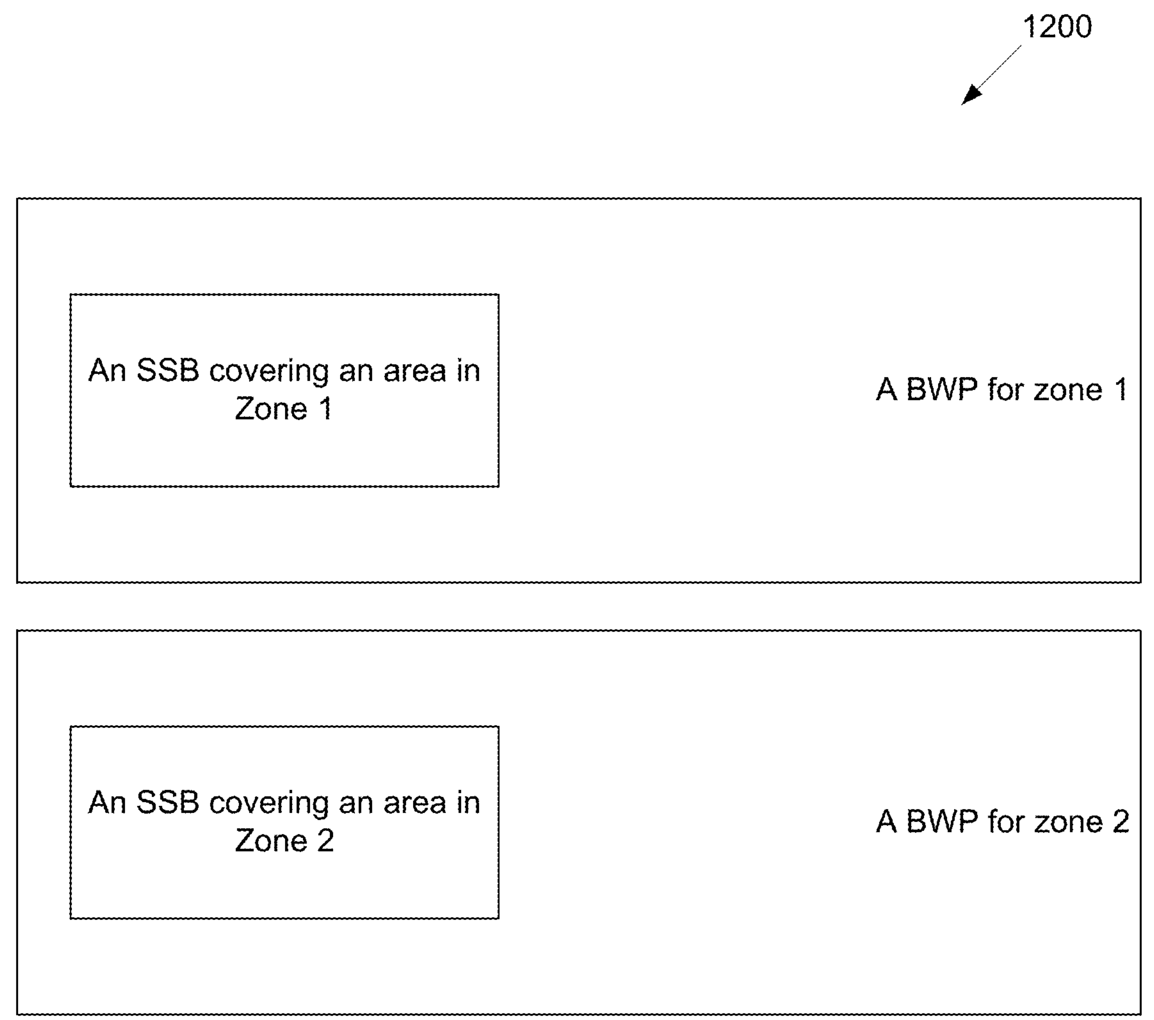
FIG. 12 illustrates an example of two initial access bandwidth parts according to embodiments of the present disclosure.

FIG. 12 illustrates an example of two initial access bandwidth parts 1200 according to embodiments of the present disclosure. An embodiment of the initial access bandwidth parts 1200 shown in FIG. 12 is for illustration only.

FIG. 12 illustrates two initial access bandwidth parts (BWPs) that comprise different zones' SSBs constructed according to some embodiments of the present disclosure. An SSB subband may comprise a bandwidth part, within which UE performs RACH process transmission/reception, PDCCH/PDSCH for the broadcast signaling (SIBs) and common control signaling (PDCCH). Initial access BWP for a UE belonging to zone 1 may be found by identifying that the SSB belongs to zone 1; and initial access BWP for a UE belonging to zone 2 may be found by identifying that the SSB belongs to zone 2.

In some embodiments, the zone configuration information indicated to the UE facilitates the UE to tune processing modules (e.g., antenna, RF, IF, baseband analog/digital modules, L2/L3 modules) according to TABLE 1.

TABLE 1

| Zone configuration information | | |
|---|---|---|
| | Zone 1 (transmission mode/scheme 1) | Zone 2 (transmission mode/scheme 2) |
| BS coverage beam | Relatively wide in azimuth, covers a shorter distance | Relatively narrow in azimuth, covers a longer distance |
| UE Rx configuration tuning | Tuned for spatial multiplexing reception; antenna and RF frontend configured for up to 8 layer reception | Tuned for narrow beam reception of up to 2 layers; Rx beamforming capability is turned on for the RF frontend |
| CSI-RS for beam management | Relatively small number of beamformed CSI-RS resources for L1/L2 mobility and beam management | Relatively large number of beamformed CSI-RS resources for L1/L2 mobility and beam management |

TABLE 1-continued

| Zone configuration information | | |
|---|---|---|
| | Zone 1 (transmission mode/scheme 1) | Zone 2 (transmission mode/scheme 2) |
| CSI-RS for CSI acquisition | Un-precoded CSI-RS with relatively large number of antenna ports (e.g., 32, 64, 128 ports) | Beamformed CSI-RS with relatively small number of antenna ports (e.g., 2 ports) |
| CSI feedback | Type-1 & type-2 feedback with specifying PMI for relatively large number of antenna ports (e.g., 32, 64, 128 ports) | Type-1 feedback with PMI for relatively small number of antenna ports (e.g., 2 ports) |
| DCI payload | Tailored towards high-order spatial multiplexing and MU-MIMO; tends to have larger number of bits | Tailored towards beamforming and low-order spatial multiplexing; tends to have smaller number of bits |
| Transmission scheme | High-order spatial multiplexing; and MU-MIMO | Up to 2 layer beamforming |
| SRS | SRS can be configured | SRS is not configured |
| Coverage | Cell center UEs (high RSRP) | Cell edge UEs (low RSRP) |

In some embodiments, a UE is equipped with two different sets of RF modules and antenna arrays operating at the upper mid band, one for zone 1, and the other for zone 2. In one such example, a set of dipole antennas are configured for zone 1 operation, and a set of patch antennas are configured for zone 2 operation. A UE is configured to switch between the two different sets of antennas, depending on the configured zone.

Figure 13:
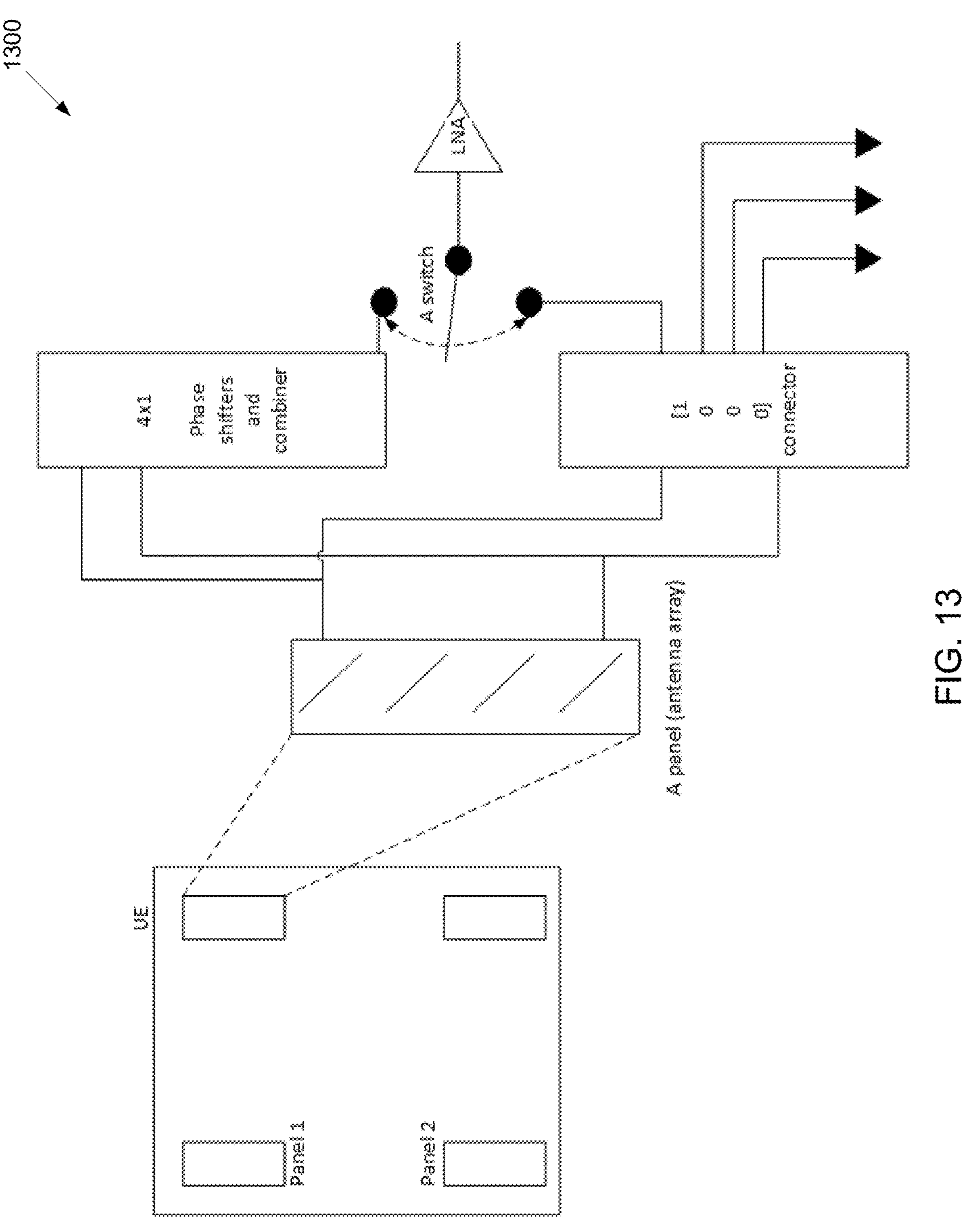
FIG. 13 illustrates an example of antenna and RF frontend design according to embodiments of the present disclosure.

FIG. 13 illustrates an example of antenna and RF frontend design 1300 according to embodiments of the present disclosure. An embodiment of the antenna and RF frontend design 1200 shown in FIG. 13 is for illustration only.

FIG. 13 illustrates antenna and RF frontend design constructed for a user equipment according to some embodiments of the present disclosure. The UE is configured with a number of antenna panels. Each panel comprises a number of antenna elements, e.g., 4 elements. Depending on the configured "zone," the UE is configured to switch between two different mode of reception. If zone 1 is configured, [1 0 0 0] connector is selected, so that the UE is configured to receive one Rx antenna's signal from each panel, to help high-order spatial multiplexing reception without analog beamforming. If zone 2 is configured, 4×1 phase shifters are combiners are selected, along with a selected analog beam, so that the UE can receive the stronger signal with a beamforming gain.

In some embodiments in the present disclosure, the terminology of Zone 1 and Zone 2 are selected as an example only. The "zones 1, 2" maybe called transmission mode 1 and 2, or transmission scheme 1 & 2, or a first and a second value for (zone) configuration information, or any other terms to distinguish two different TRX operations and preparations at each of the UE and the BS side.

In some embodiments, a UE is configured with two "serving" SSB indices, one selected from a set of SSB indices corresponding to zone 1 and the other selected from a set of SSB indices corresponding to zone 2. These two serving SSBs corresponding to the two serving SSB IDs, denoted as zone-1 SSB and zone-2 SSB, respectively, may be used as respective QCL reference resources for PDSCH DMRS, CSI-RS, etc., for the two zones, as well as time-frequency synchronization references. In one method, the zone-2 SSB is a QCL reference for one set of QCL parameters, e.g., spatial Rx parameters, as well as delay and Doppler parameters; while the zone-1 SSB is a QCL reference for another set of QCL parameters, e.g., delay and Doppler parameters.

In some embodiments, a UE is configured to monitor a group of FDM'ed SSBs that are in the same time duration as the serving zone-1 SSB and report the RSRPs of some of those SSBs in the group.

In some embodiments, a UE is configured to report a number RSRPs based on measurements on non-serving zone-1 SSBs.

In some embodiments, a UE is configured to report a number of RSRPs measured from a group of zone-2 SSBs that are associated with a set of zone-1 SSBs (i.e., zone-2 SSBs are associated with a zone-1 SSB if the zone-2 SSBs are mapped in the same time duration as the zone-1 SSB), wherein the set of zone-1 SSBs to measure and report RSRPs for, are indicated by the network via RRC or MAC CE signaling.

This helps the network to maintain two candidate beams from the two different zones that are configured with the same analog beam, and the network can perform a "fall-back" operation with a secondary beam when the first priority beam results in reception failure at an IE. For this purpose, the network indicates "a group-SSB ID" to the UE so that the UE can monitor RSRPs, wherein the group-SSB ID indicates a group of SSBs (a set of corresponding SSB IDs) that are within the same time duration (and on the same analog beam) as shown in FIG. 8. The time duration here could be a set of consecutive OFDM symbols, e.g., 4 consecutive OFDM symbols that comprise PBCH, SSB and PSS.

In some embodiments, network selects a zone and a corresponding beam for a UE, dynamically between zone 1 and zone 2 through a DCI indication. Here, zone 2 transmission is regarded as a fallback transmission scheme, and zone 1 transmission is regarded as a main scheme. UE performs blind detection between two DCI formats, one for zone 1 (denoted as zone-1 DCI) and the other for zone 2 (denoted as zone-2 DCI), wherein the DCI payloads are different.

Upon receiving the zone-2 DCI, UE is configured to apply an Rx beamforming that has been selected for receiving a zone-2 SSB beam. In one method, the zone-2 SSB ID is semi-statically configured via RRC. In another method, the zone-2 SSB ID is indicated by a MAC CE. In another method, the zone-2 SSB ID is dynamically indicated through the same DCI format used for scheduling zone-2 PDSCH. In this case, the zone-2 PDSCH DMRS is QCL'ed with the indicated zone-2 SSB in spatial Rx parameters.

In some embodiments, UE is configured to maintain one SSB as a primary QCL reference; and the UE's zone operation (or transmission mode) is determined by the zone ID associated with the SSB. For this purpose, network indicates the UE of one SSB ID. The indication can be either via RRC signaling or via MAC CE signaling.

Figure 14:
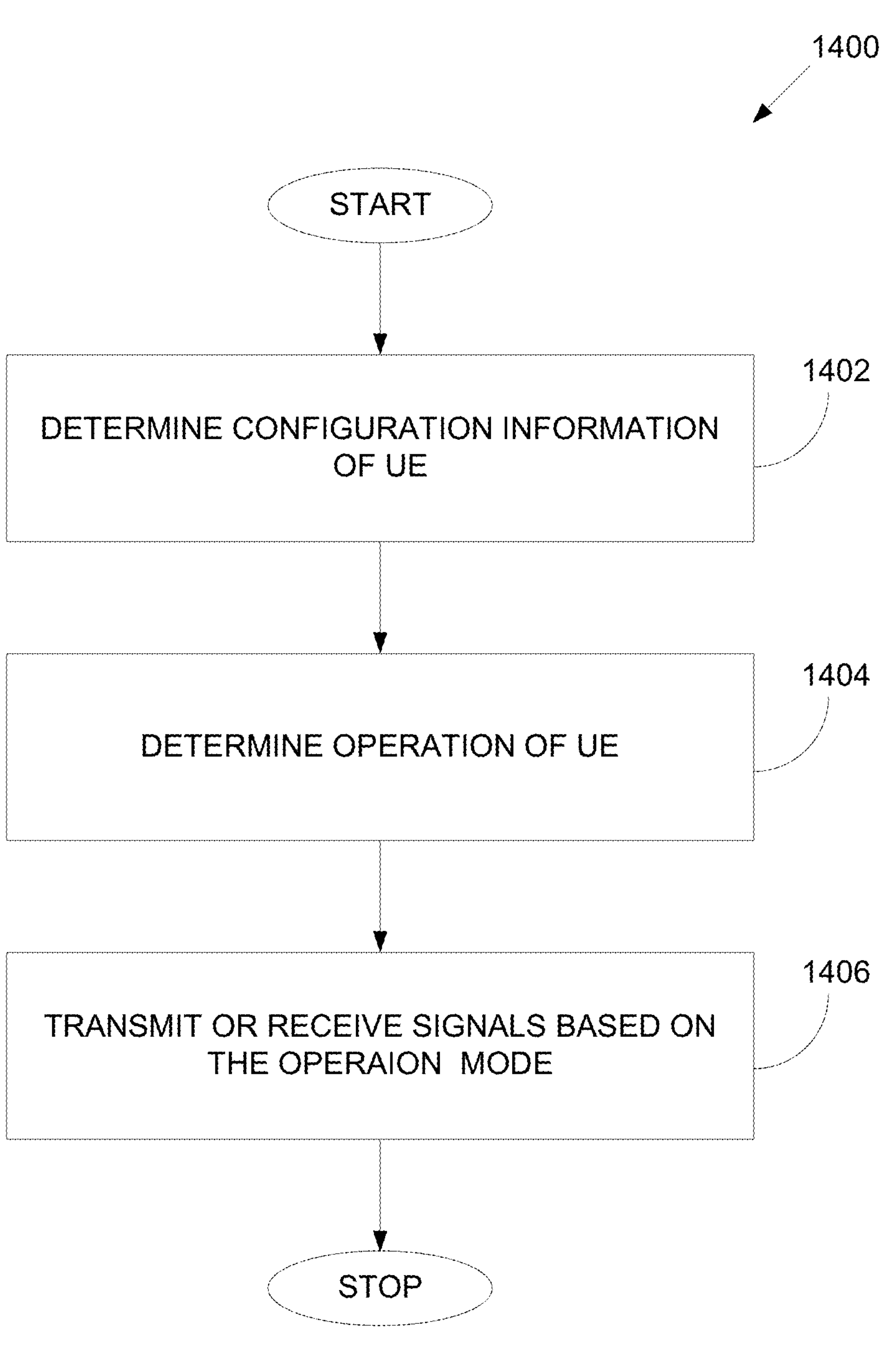
FIG. 14 illustrates a flowchart of a BS method for supporting multiple beam operations according to embodiments of the present disclosure.

FIG. 14 illustrates a flowchart of BS method 1400 for supporting multiple beam operations according to embodiments of the present disclosure. The BS method 1400 as may be performed by a BS (e.g., 101-103 as illustrated in FIG. 1). An embodiment of the BS method 1400 shown in FIG. 14 is for illustration only. One or more of the components illustrated in FIG. 14 can be implemented in specialized circuitry configured to perform the noted functions or one or more of the components can be implemented by one or more processors executing instructions to perform the noted functions.

As illustrated in FIG. 14, the method 1400 begins at step 1402. In step 1402, a BS determine a configuration information of a UE based on indication information included in an SSB, the configuration information corresponding to a first value or a second value.

In step 1404, the BS determines, based on the configuration information, an operation mode to identify a UE Tx scheme and a UE Rx scheme, wherein the operation mode comprises a first operation mode corresponding to the first value or a second operation mode corresponding to the second value.

In one embodiment, the first operation mode is used for up to four or eight layers spatial multiplexing downlink transmission and the second operation mode is used for up to two layers beamforming downlink transmissions.

In one embodiment, the SSB includes the indication information, wherein each of synchronization signals is generated based on a sequence ID; information is transmitted in the PBCH, or is mapped to the sequence ID, or is mapped to a sequence ID of a demodulation reference signal (DMRS) for the PBCH; and transmits the SSB.

In another embodiment, the SSB includes information that indicates time and frequency location information of SSBs transmitted over a same carrier; and the information comprising a total number of time division multiplexed SSBs (TDM'ed SSBs) and a time location index of each of the SSBs is transmitted over a PBCH.

In step 1406, the BS transmits or receives signals based on the determined operation mode.

In one embodiment, the BS generates, based on a first periodicity, the SSB associated with the first value of the configuration information or to generate, based on a second periodicity, the SSB associated with the second value of the configuration information; and the BS transmits the SSB.

In one embodiment, the BS identifies, based on a resource index on which a PRACH is detected, a value of the configuration information that the UE is configured for initial access transmissions and receptions, identifies resources for the PRACH based on the value of the configuration information; and transmits, to the UE, information for the resources of the PRACH, and receives, from the UE, the PRACH on one of the resources for the PRACH corresponding to the value of the configuration information.

In one embodiment, the BS transmits an RRC information element for updating the operation mode of the UE comprising at least one of an SSB ID or a value of the configuration information, the value of the configuration information associated with the SSB ID being configured when the SSB ID only is indicated to update the operation mode.

In one embodiment, the BS transmits, to the UE, DCI including a first DCI format and a second DCI format to dynamically switch the operation mode between the first operation mode and the second operation mode; the first DCI format and the second DCI format are blindly detected; and DCI payloads corresponding to the first DCI format and the second DCI format are different each other.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A base station (BS) comprising:

a processor configured to:

determine a configuration information of a user equipment (UE) based on indication information included in a synchronization signal and physical broadcast channel (PBCH) block (SSB), the configuration information corresponding to a first value or a second value, and determine, based on the configuration information, an operation mode to identify a UE transmit (Tx) scheme and a UE receive (Rx) scheme, wherein the operation mode comprises a first operation mode corresponding to the first value or a second operation mode corresponding to the second value; and a transceiver operably coupled to the processor, the transceiver configured to transmit or receive signals based on the determined operation mode.

2. The BS of claim 1, wherein:

the processor is further configured to generate, based on a first periodicity, the SSB associated with the first value of the configuration information or to generate, based on a second periodicity, the SSB associated with the second value of the configuration information; and the transceiver is further configured to transmit the SSB.

3. The BS of claim 1, wherein:

the first operation mode is used for up to four or eight layers spatial multiplexing downlink transmission; and the second operation mode is used for up to two layers beamforming downlink transmissions.

4. The BS of claim 1, wherein:

the processor is further configured to:

identify, based on a resource index on which a physical random access channel (PRACH) is detected, a value of the configuration information that the UE is configured for initial access transmissions and receptions, identify resources for the PRACH based on the value of the configuration information; and the transceiver is further configured to:

transmit, to the UE, information for the resources of the PRACH, and receive, from the UE, the PRACH on one of the resources for the PRACH corresponding to the value of the configuration information.

5. The BS of claim 1, wherein:

the SSB includes the indication information, wherein each of synchronization signals is generated based on a sequence ID;

information is transmitted in the PBCH, or is mapped to the sequence ID, or is mapped to a sequence ID of a demodulation reference signal (DMRS) for the PBCH; and the transceiver is further configured to transmit the SSB.

6. The BS of claim 1, wherein:

the SSB includes information that indicates time and frequency location information of SSBs transmitted over a same carrier; and the information comprising a total number of time division multiplexed SSBs (TDM'ed SSBs) and a time location index of each of the SSBs is transmitted over a physical broadcasting channel (PBCH).

7. The BS of claim 1, wherein the transceiver is further configured to transmit a radio resource control (RRC) information element for updating the operation mode of the UE comprising at least one of an SSB ID or a value of the configuration information, the value of the configuration information associated with the SSB ID being configured when the SSB ID only is indicated to update the operation mode.

8. The BS of claim 1, wherein:

the transceiver is further configured to transmit, to the UE, downlink control information (DCI) including a first DCI format and a second DCI format to dynamically switch the operation mode between the first operation mode and the second operation mode;

the first DCI format and the second DCI format are blindly detected; and

DCI payloads corresponding to the first DCI format and the second DCI format are different each other.

9. A user equipment (UE) comprising:

a processor; and a transceiver configured to receive or transmit signals, from a base station (BS) or to the BS, based on an operation mode comprising a first operation mode corresponding to a first value or a second operation mode corresponding to a second value, wherein the operation mode is identified by a UE transmit (Tx) scheme and a UE receive (Rx) scheme, wherein a configuration information including the first value and the second value is identified based on indication information included in a synchronization signal and physical broadcast channel (PBCH) block (SSB).

10. The UE of claim 9, wherein the processor is further configured to:

identify, via a time domain search operation over a first SSB band, the SSB based on a reference signals received power (RSRP);

determine whether the RSRP is higher than a threshold;

determine the SSB as a synchronization reference to perform a subsequent reception and transmission based on a determination that the RSRP is higher than the threshold;

measures the RSRP corresponding to other SSBs in other SSB bands and identify another SSB achieving a highest RSRP among the other SSBs based on a determination that the RSRP is lower than the threshold; and determine the other SSB as a synchronization reference to perform a subsequent signaling reception and transmission.

11. The UE of claim 9, wherein:

the transceiver is further configured to receive the SSB; and the processor is further configured to:

detect, based on a periodicity hypothesis, the SSB in the first operation mode or the second operation mode, determine the SSB as an SSB in the first operation mode when the SSB is detected based on the periodicity hypothesis for the first operation mode, and determine the SSB as an SSB in the second operation mode when the SSB is detected based on the periodicity hypothesis for the second operation mode.

12. The UE of claim 9, wherein:

the transceiver is further configured to receive, from the BS, information for resources of a physical random access channel (PRACH), the resources being identified based on a value of the configuration information;

the processor is further configured to:

identify, based on a resource index on which a PRACH is detected, the value of the configuration information that the UE is configured for initial access transmissions and receptions, and identify, based on the resources of the PRACH, a zone for an initial access; and the transceiver is further configured to transmit, to the BS, the PRACH on one of the resources for the PRACH corresponding to value of the configuration information.

13. The UE of claim 9, wherein:

the processor is further configured to switch, based on the configuration information, between reception modes that are different each other; and the transceiver is further configured to:

receive, via a connector, an Rx antenna signal for a higher-order spatial multiplexing reception without an analog beamforming when the first operation mode is configured, and receive, via a 4×1 phase shifter, an Rx antenna signal with the analog beamforming when the second operation mode is configured.

14. The UE of claim 9, wherein:

the UE is further configured with an SSB index associated with the SSB, including the first value of the configuration information and another SSB index associated with another SSB, including the second value of the configuration information;

the SSB is used as a quasi co-location (QCL) reference for a set of delay and Doppler parameters; and the other SSB is used as the QCL reference for a set of spatial Rx parameters and the set of delay and Doppler parameters.

15. The UE of claim 9, wherein the processor is further configured to:

monitor a group of frequency-multiplexed SSBs that is located in a time duration same as a time duration of the SSB including the first value of the configuration information; and report a set of a reference signals received powers (RSRPs) of SSBs in the group of frequency-multiplexed SSBs based on a measurement operation for the SSBs in the group of frequency-multiplexed SSBs.

16. The UE of claim 9, wherein:

the transceiver is further configured to receive, from the BS, downlink control information (DCI) including a first DCI format and a second DCI format to dynamically switch the operation mode between the first operation mode and the second operation mode; and the processor is further configured to:

blindly detect the first DCI format and the second DCI format, and

DCI payloads corresponding to the first DCI format and the second DCI format are different each other.

17. A method of a base station (BS), the method comprising:

determining a configuration information of a user equipment (UE) based on indication information included in a synchronization signal and physical broadcast channel (PBCH) block (SSB), the configuration information corresponding to a first value or a second value;

determining, based on the configuration information, an operation mode to identify a UE transmit (Tx) scheme and a UE receive (Rx) scheme, wherein the operation mode comprises a first operation mode corresponding to the first value or a second operation mode corresponding to the second value; and transmitting or receive signals based on the determined operation mode.

18. The method of claim 17, further comprising:

generating, based on a first periodicity, the SSB associated with the first value of the configuration information or to generate, based on a second periodicity, the SSB associated with the second value of the configuration information; and transmitting the SSB.

19. The method of claim 17 wherein:

the first operation mode is used for up to four or eight layers spatial multiplexing downlink transmission;

the second operation mode is used for up to two layers beamforming downlink transmissions;

the SSB includes information configuration information, wherein each of synchronization signals is generated based on a sequence ID;

the information is transmitted in the PBCH, or is mapped to the sequence ID, or is mapped to a sequence ID of demodulation reference signal (DMRS) for the PBCH;

the SSB includes information that indicates time and frequency location information of SSBs transmitted over a same carrier; and the information comprising a total number of time division multiplexed SSBs (TDM'ed SSBs) and a time location index of each of the SSBs is transmitted in a physical broadcasting channel (PBCH).

20. The method of claim 17, further comprising:

identifying, based on a resource index on which a physical random access channel (PRACH) is detected, a value of the configuration information that the UE is configured for initial access transmissions and receptions;

identifying resources for the PRACH based on the first and second values of the configuration information;

transmitting, to the UE, information for the resources of the PRACH; and receiving, from the UE, the PRACH on one of the resources for the PRACH corresponding to the value of the configuration information.

* * * * *